(12) United States Patent
Park et al.

(10) Patent No.: US 10,871,393 B2
(45) Date of Patent: *Dec. 22, 2020

(54) DYNAMIC SENSOR PERFORMANCE ADJUSTMENT

(71) Applicant: MICROSOFT TECHNOLOGY LICENSING, LLC, Redmond, WA (US)

(72) Inventors: Hee jun Park, Sammamish, WA (US); Travis Legg, Seattle, WA (US); Eric Charles Abbott, Fall City, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/419,510

(22) Filed: May 22, 2019

(65) Prior Publication Data

US 2019/0271585 A1 Sep. 5, 2019

Related U.S. Application Data

(63) Continuation of application No. 15/288,148, filed on Oct. 7, 2016, now Pat. No. 10,302,482.

(51) Int. Cl.
*G06F 17/40* (2006.01)
*G01J 1/02* (2006.01)
*G06F 3/03* (2006.01)

(52) U.S. Cl.
CPC ........... *G01J 1/0228* (2013.01); *G01J 1/0219* (2013.01); *G01J 1/0238* (2013.01); *G06F 3/03* (2013.01); *G06F 3/0325* (2013.01)

(58) Field of Classification Search
CPC ....... G01J 1/0238; G01J 1/0228; G01J 1/0219
USPC ........................................................ 702/182
See application file for complete search history.

(56) References Cited

U.S. PATENT DOCUMENTS

| | | | | |
|---|---|---|---|---|
| 7,302,362 B2* | 11/2007 | Misra | ........................ | G01D 1/18 340/3.1 |
| 7,948,373 B2* | 5/2011 | Bauer | ....................... | H04Q 9/00 340/539.22 |
| 2005/0200480 A1* | 9/2005 | Caras | ................... | G08B 25/003 340/539.22 |

* cited by examiner

*Primary Examiner* — Lam S Nguyen
(74) *Attorney, Agent, or Firm* — Workman Nydegger

(57) ABSTRACT

Systems are provided for optimizing system overhead when handling multiple input streams of sensor data is configured to identify a set of sensors that are configured to communicate sensor data to the computer system. The systems are configured to receive sensor data from each sensor within the set of sensors and to categorize the sensor data received from each sensor within the set of sensors. Additionally, the systems are configured to identify an overhead attribute associated with each sensor within the set of sensors and to adjust a state of at least one sensor within the set of sensors based upon both a category and an overhead attribute associated with each of the sensors.

19 Claims, 6 Drawing Sheets

DYNAMIC SENSOR PERFORMANCE ADJUSTMENT

CROSS-REFERENCE TO RELATED APPLICATIONS

This application is a continuation of U.S. patent application Ser. No. 15/288,148 filed on Oct. 7, 2016, entitled "DYNAMIC SENSOR PERFORMANCE ADJUSTMENT," which issued as U.S. Pat. No. 10,302,482 on May 28, 2019, and which application is expressly incorporated herein by reference in its entirety.

BACKGROUND

Sensors are increasingly being integrated into electronic devices and systems. For example, some wearable devices use various sensors to track health metrics of a user. The health metrics may be tracked through a combination of accelerometers, gyroscopes, barometers, pulse-oximeters, GPS units, and other similar sensors. Each of these sensors may provide information to one or more processors for analysis.

Additionally, in some cases, the wearable device may also be associated with a second device, such as a mobile phone. In such a case, the wearable device and the mobile phone may both comprise sensors that are capable of tracking metrics related to the user. For instance, both the wearable device and the mobile phone may be independently capable of tracking the user's steps.

The addition of sensors to electronic devices and systems has increased the function and capabilities of the devices and systems. However, most sensors are also associated with overhead and various costs that reduce the performance of the devices and systems. For instance, some sensors may require battery power that reduces the power that would otherwise be available for the device or system. Ensuring that sufficient and accurate information is received from the sensors, while at the same time, managing system overhead presents several technical challenges The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatus configured to optimize system overhead and sensor data when handling multiple inputs of sensor data. In particular, disclosed embodiments comprise multiple sensors that transmit sensor data to a processor. In some cases, different sensors communicate related sensor data to the processor. The processor is configured to analyze the sensor data and determine adjustments to the sensors that optimize the system overhead contributed by the sensors that are gathering related data.

Disclosed embodiments include a computer system for optimizing system overhead when handling multiple input streams of sensor data. The computer system is configured to identify a set of sensors that communicate sensor data to the computer system. The system receives the sensor data from each sensor within the set of sensors. The system categorizes the sensor data received from each sensor within the set of sensors. Additionally, the system identifies an overhead attribute associated with each sensor within the set of sensors. The system then adjusts a state of at least one sensor within the set of sensors based upon both a category and an overhead attribute associated with the at least one sensor.

Disclosed embodiments also include a method for optimizing sensor performance. The method includes identifying a set of sensors that are configured to communicate sensor data to a computer system. The method also includes receiving the sensor data from each sensor within the set of sensors. Additionally, the method includes categorizing the sensor data received from each sensor within the set of sensors. The method includes identifying an overhead attribute associated with each sensor within the set of sensors. Further, the method includes adjusting a state of at least one sensor within the set of sensors based upon both a category and an overhead attribute associated with the at least one sensor.

Additionally, disclosed embodiments include a computer-based sensor system that comprises a first device comprising a first set of one or more sensors configured to communicate first sensor data to a processing unit. The system also comprises a second device comprising a second set of one or more sensors configured to communicate second sensor data to the processing unit. The processing unit is in communication with both the first device and the second device. The processing unit is configured to identify related information within both the first sensor data and the second sensor data. The processing unit is also configured to identify an overhead attribute associated with at least one sensor within the first set of one or more sensors. Additionally, the processing unit is configured to adjust a sampling rate of the at least one sensor based upon the overhead attribute and the related information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments provide significant technical improvements to the systems, methods, and apparatuses that optimize overhead associated with multiple input streams of sensor data. The system overhead may comprise a number of different system characteristics and attributes such as power consumption associated with each sensor, network and communication bandwidth associated with each sensor, processor bandwidth and bus bandwidth associated with each sensor, processing workload associated with each sensor, and various other similar overhead attributes. At least one disclosed embodiment categorizes sensor data received from one or more sensors and optimizes system overhead by adjusting at least one sensor's state based upon overhead associated with the sensor and the category of the sensor. Accordingly, disclosed embodiments provide significant technical advantages to the performance of systems, methods, and apparatuses that receive multiple input streams from different sensors.

Figure 1:
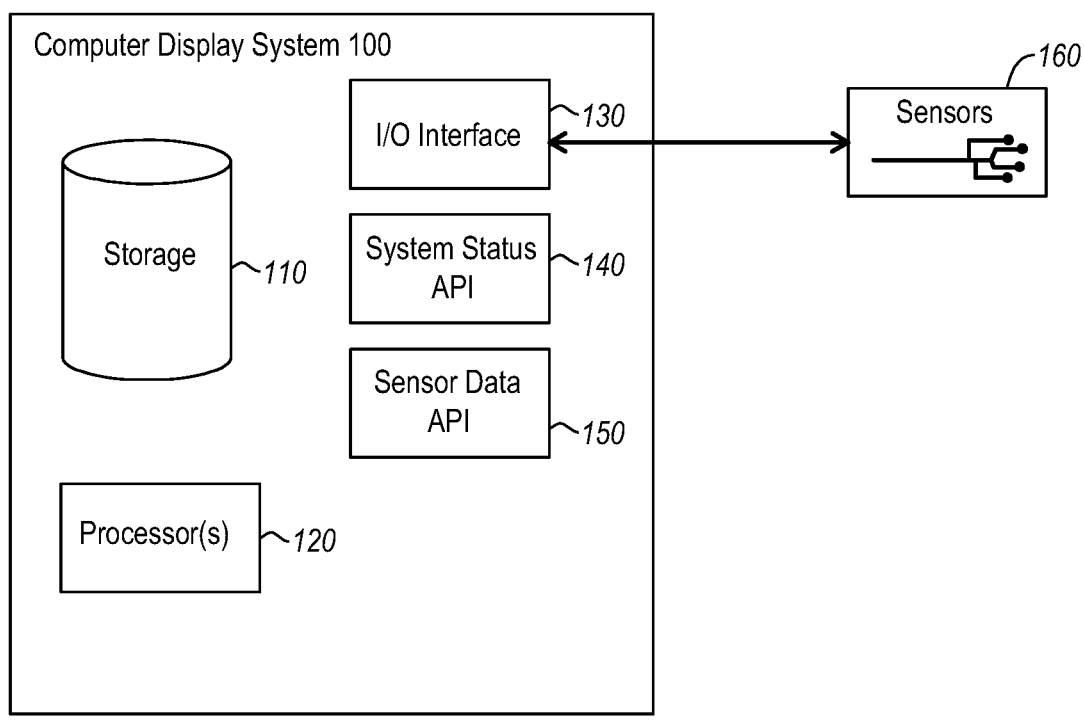
FIG. 1 illustrates a schematic view of an embodiment of a computer system for optimizing system overhead when handling multiple input streams of sensor data.

Turning now to the figures, FIG. 1 illustrates a schematic view of an embodiment of a computer system 100 for system optimizing overhead when handling multiple input streams of sensor data. The depicted computer system 100 comprises storage 110, processor(s) 120, an I/O interface 130, a system status application program interface ("API") 140, and a sensor data API 150. The computer system 100 may comprise a single discrete device, multiple different device in communication with each other, a distributed system, or any other configuration that is capable of receiving sensor data from sensors and processing the data with one or more processors. The I/O interface 130 is in communication with sensors 160. Each of the depicted components 110, 120, 130, 140, 150, 160 within FIG. 1, and other figures described herein, are provided for the sake of example and clarity and do not infer or require a particular configuration or structure of the disclosed embodiments. As such, the depicted components 110, 120, 130, 140, 150, 160 may be otherwise configured, named, divided, and combined.

Additionally, the depicted components 110, 120, 130, 140, 150, 160 may comprise software elements, hardware elements, or a combination thereof. For instance, storage 110 may comprise physical storage such as RANI and/or software data structures such as a relational database. Similarly, the system status API 140, for example, may comprise a software API and associated hardware for monitoring a system's states.

In at least one embodiment, the computer system 100 comprises processor(s) 120 and one or more computer-readable media (e.g., storage 110) having stored thereon executable instructions that are operable when executed by the one or more processors to cause the computer system to perform various acts. For example, the computer system 100 identifies a set of sensors 160 that are configured to communicate sensor data to the computer system 100. The sensors 160 may comprise multiple homogenous and/or heterogeneous sensors within a single device or distributed between multiple devices. The sensor data comprises raw and/or processed data received from each sensor or subset of sensors. For example, in at least one embodiment, the sensors include a gyroscope and a camera. The corresponding sensor data comprises raw data from the gyroscope and image data from the camera.

The computer system 100 receives the sensor data, through the I/O interface 130, from each sensor within the set of sensors 160. In various embodiments, the I/O interface 130 receives the sensor data through wireless communication channels and/or through direct wired channels. For example, the I/O interface 130 may receive sensor data through a wired serial port from a first local sensor that is integrated within the same device as the I/O interface 130. Additionally, the I/O interface 130 may also receive sensor data through a wireless protocol from a second remote sensor that is disposed within a second distinct device. As such, in at least one embodiment, the I/O interface 130 and processors 120 are disposed within a single device, and the I/O interface 130 receives sensor data from devices that are not in physical communication with the I/O interface 130.

Upon receiving the sensor data, sensor data API 150 is used to categorize the sensor data received from each sensor within the set of sensors 160. The sensor data can be categorized based upon the data itself or based upon the sensor from which the sensor data was received. For example, in at least one embodiment, the sensor data API 150 categorizes the sensor data based upon the signal-to-noise ratio (SNR) of the signal. In additional or alternative embodiments, the sensor data API 150 categorizes the sensor data based upon a uniqueness of the sensor data from a particular sensor with respect to other sensors within the set of sensors.

As used herein, the uniqueness of sensor data is determined with respect to sensor data that is available from other sensors. In particular, the uniqueness of the sensor data is based upon the availability of similar data from other sensors. For example, in at least one embodiment, the sensor data API 150 identifies sensor data being received from two different gyroscope sensors that are associated with the same device. Based upon the similarity in data received from the two gyroscope sensors, the sensor data API 150 categorizes the sensor data from the two sensors as having a low level of uniqueness.

Similarly, in at least one embodiment, the sensor data API 150 identifies sensor data being received from a high-definition camera sensor and from a gyroscope sensor. In this case, even though the actual data received from the high-definition camera is different, the sensor data API 150 identifies that the sensor data from the high-definition camera sensor and the gyroscope sensor can both be used to derive information about rotation. The sensor data API 150 categorizes the sensor data from the two sensors as having a low level of uniqueness with respect to rotation, but having a high level of uniqueness otherwise.

In addition to identifying uniqueness, the sensor data API 150 is capable of identifying that sensor data from a first sensor relates to sensor data from one or more other sensors from the set of sensors 160. As used herein, a first set of sensor data relates to a second set of sensor data when the sensor data API 150 determines that both sets of sensor data can be independently used for a particular purpose. In some embodiments, the sensor data API 150 determines that the first set of sensor data and the second set of sensor data comprise overlapping information. For example, the first set of sensor data may comprise altitude information from a GPS sensor and the second set of sensor data may comprise altitude information from an altimeter. In this case, the first set of sensor data and the second set of sensor data are not unique from each other and they are related.

In contrast, in some other embodiments, the sensor data API 150 determines that the first set of sensor data and the second set of sensor data are related even though they provide distinctly different information. For instance, the first set of sensor data may comprise location information from a GPS sensor and the second set of sensor data may comprise velocity information from an accelerometer sensor. While the information provided by these sensors are different, the sensor data API 150 determines that they are related because the computer system 100 utilizes a Kalman filter that combines the velocity information from an accelerometer with the location information from the GPS sensor in order to correct for sensor drift. As such, in at least one embodiment, the sensor data API 150 is aware of the various uses of the different sensor data and the current needs of the computer system. In this case, the sensor data from the accelerometer sensor and the GPS sensor is unique from each other but the sensor data is still related.

In further additional or alternative embodiments, the sensor data API 150 also categorizes the sensor data based upon a confidence associated with the sensor data from a particular sensor with respect to other sensors within the set of sensors. As used herein, a confidence associated with sensor data indicates the reliability and/or sensitivity of data received from a particular sensor. For example, a particular sensor may provide a relatively high sample rate, a high SNR, a high resolution, or some other similar attribute. Additionally, the sensor data API 150 is capable of categorizing the confidence associated with sensor data from a sensor in multiple different confidence categories based upon the desired information. For instance, the sensor data API 150 may categorize a GPS sensor as having a low level of confidence for altitude readings but a high confidence for location readings. Accordingly, when receiving sensor data from a single sensor, the sensor data API 150 can categorize the sensor data into multiple categories based on the confidence in the data received with respect to a variety of different, distinct purposes.

In various additional or alternative embodiments, the sensor data API 150 categorizes the sensor data into multiple different categories. In contrast, in various additional or alternative embodiments, the sensor data API 150 categorizes the sensor data into a single category (e.g., uniqueness or confidence). Additionally, in various additional or alternative embodiments, the sensor data API 150 categorizes the sensor data in additional categories than those mentioned above. For example, the sensor data API 150 is capable of categorizing the sensor data based upon latency, size, sampling rate, and any other category of interest.

In at least one embodiment, once the sensor data API 150 has categorized sensor data, the system status API 140 identifies an overhead attribute associated with each sensor within the set of sensors. As used herein, an overhead attribute comprises a system cost associated with receiving and or processing the sensor data from a particular sensor. For example, an overhead attribute can comprise one or more of a power consumption associated with the particular sensor, a bandwidth associated with the particular sensor, a processing workload associated with the particular sensor, a thermal impact of a particular sensor, or any other attribute related to a cost placed on a computer system in relation to a particular sensor or set of sensors.

An overhead attribute of power consumption indicates the amount of power required to power and receive sensor data from a particular sensor. Power consumption may be measured as current draw, watts, or any other useful metric. For example, the system status API 140 may indicate that a particular accelerometer sensor draws 400 µA of current when in normal use. In contrast, the system status API 140 may indicate that a particular camera sensor draws 2 W of power when in use.

An overhead attribute of bandwidth indicates the amount of communication bandwidth and/or processing bandwidth associated with a particular sensor. For example, a high-resolution wireless LIDAR sensor may consume a large amount of wireless bandwidth when communicating sensor data. Similarly, the high-definition camera sensor may consume a large amount of processing bandwidth in order to derive the necessary sensor information from the image data. The processing bandwidth takes the form of relative processing time consumed by the processing, bus bandwidth consumed by the processing, cache memory consumed by the processing, and/or any other processing resource consumed by handling the sensor data.

An overhead attribute of processing workload indicates the processing power associated with sensor data from a particular sensor. In at least one embodiment, the processing workload attribute relates to the processing bandwidth attribute. The processing workload attributes indicates the amount of processing time required to extract desired information from sensor data, the amount of threads generated when extracting desired information from sensor data, and other similar measurements.

In at least one embodiment, after categorizing the sensor data and identifying an overhead attribute associated with the sensor data, the processor(s) 120 adjusts a state of at least one sensor within the set of sensors 160 based upon both a category and an overhead attribute associated with the at least one sensor. Adjusting a state of at least one sensor can comprise deactivating or activating the sensor, placing the sensor within a low-power mode, decreasing or increasing the sampling rate of the sensor, increasing or decreasing the sampling rate of communications between the sensor and the I/O interface 130, or otherwise adjusting the operating state of the sensor.

When adjusting the state of one or more sensors, the processor(s) 120 determine what sensors to adjust and how to adjust those sensors. In at least one embodiment, the processor(s) 120 adjust the sensor to optimize the data received per system overhead added by the sensors. For example, in at least one embodiment, the processor(s) 120 determine that rotational data can be derived from sensor data being received from both a gyroscope sensor and a camera sensor. The processor(s) 120 further determine that the camera creates more system overhead, in the form of processor usage and bandwidth, than the gyroscope. Based upon this determination, the processor(s) 120 deactivates the camera sensor and relies upon the gyroscope for rotational data. As such, the processor(s) 120 determines that the data received from the gyroscope is sufficient to meet the current needs of the computer system 100 and as such saves system resources, such as power usage, by deactivating the camera sensor.

In an alternative embodiment, the processor(s) 120 may identify that the gyroscope sensor and camera sensor provide similar overlapping information and that the gyroscope sensor consumes less resources than the camera sensor; however, the processor(s) 120 may also identify that the camera is providing additional sensor data, such as object tracking, that is categorized as unique from any other available sensor data. In such a case, the processor(s) 120 may deactivate the gyroscope sensor in order to consume less system resources overall even though the gyroscope sensor individually uses less resources than the camera sensor.

In at least one embodiment, when determining what sensor(s) to adjust, the processor(s) 120 identify a priority of the sensor data from the at least one sensor based upon a relationship between a uniqueness of the sensor data from the at least one sensor and an overhead attribute associated with the at least one sensor. For example, the priority may comprise a relationship defined by a calculated ratio between the uniqueness of the sensor data and the overhead associated with the sensor data. For example, the processor(s) 120 may categorize sensor data on a uniqueness scale of 1-10. Similarly, the processor(s) 120 may classify the sensor data on an overhead scale of 1-10. The processor(s) 120 may then calculate a priority associated with a sensor by dividing the number associated with uniqueness by the number associated with overhead. In at least one embodiment, the processor(s) 120 increase system resources that are dedicated to sensors with high priority and lower system resources that are used by sensors with low priority.

One will understand, however, that the above example of calculating priority is merely for example and that in practice priority may be based upon multiple variables having to do with different derivable information that is gatherable from the sensor data and based upon the current needs of the computer system 100. For example, a barometer sensor may provide extremely unique data and also have an extremely low overhead attribute associated with the barometer sensor; however, the processor(s) 120 may associate a low priority with the barometer sensor because the computer system 100 may currently have no use for barometric information.

In at least one embodiment, the processor(s) 120 adjusts states of one or more sensors based, at least in part, upon a combination of the category assigned to the sensor data and the overhead attribute associated with each sensor. In at least one alternative embodiment, the processor(s) 120 adjusts states of one or more sensors based upon only the category assigned to the sensor data or the overhead attribute associated with each sensor. Similarly, in additional alternative embodiments, the processor(s) 120 adjusts states of one or more sensors based upon a combination of the category assigned to the sensor data and/or the overhead attribute associated with each sensor and other system information, such as the current needs of the system.

In some embodiments, the confidence associated with each of the sensors can also be used to determine which sensor(s) to adjust, alone or in combination with the other factors. For example, the system may filter out sensor data from sensors having a lower level of confidence than sensor data that is ultimately consumed. Adjustments can also include tuning sensors having lower confidence to increase the confidence of the sensors.

Figure 2:
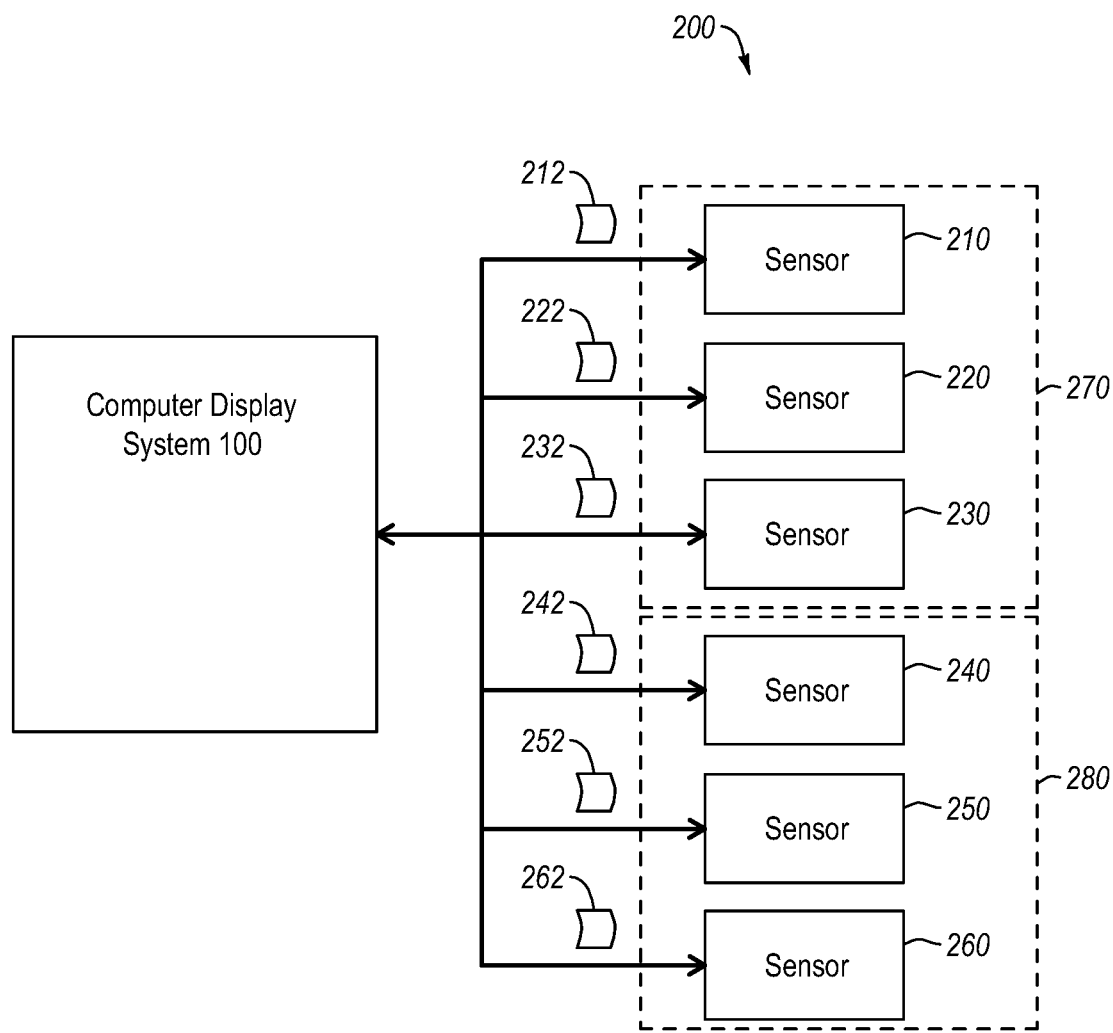
FIG. 2 illustrates a schematic view of another embodiment of a computer system for optimizing system overhead when handling multiple input streams of sensor data.

FIG. 2 illustrates a schematic view of another embodiment of a computer system 100 for optimizing system overhead when handling multiple input streams of sensor data. The depicted system is in communication with a set of sensors 200. Each sensor 210, 220, 230, 240, 250, 260 is communicating sensor data 212, 222, 232, 242, 252, 262 to the computer system 100. The set of sensors 200 comprises a first subset of sensors 270 disposed within a first device and a second subset of sensors 280 disposed within a second device. In at least one embodiment, the first device and the second device are physically separate devices. For example, the first subset of sensors 270 may be disposed with a head-mounted display and the second subset of sensors 280 may be disposed within a hand-held controller that communicates with the head-mounted display.

In at least one embodiment, the sensors 210, 220, 230, 240, 250, 260 communicate sensor data 212, 222, 232, 242, 252, 262 to the computer system 100. The computer system 100, using the methods described above, categorizes the sensor data 212, 222, 232, 242, 252, 262 and/or identifies an overhead attribute associated with each sensor 210, 220, 230, 240, 250, 260. The computer system 100 then optimizes the system by adjusting the state of one or more sensors 210, 220, 230, 240, 250, 260.

For example, the computer system 100 may determine that sensor 210 and sensor 250 are providing related information. The computer system 100 may also determine that at least a portion of the sensor data is unnecessary, so the computer system 100 may deactivate sensor 210 or decrease the sampling rate. Similarly, the computer system 100 may determine that sensor 230 and sensor 240 are providing related information, but that the computer system 100 is currently in need of high quality and high-resolution sensor data of the type that sensor 230 and sensor 240 provide. Accordingly, the computer system 100 may adjust the state of sensors 230 and 240 by increasing the sampling rate provided by the respective sensors. As such, in various embodiments, the computer system 100 increases or decreases the system resources provided to sensors based upon the needs of the computer system 100.

Figure 3:
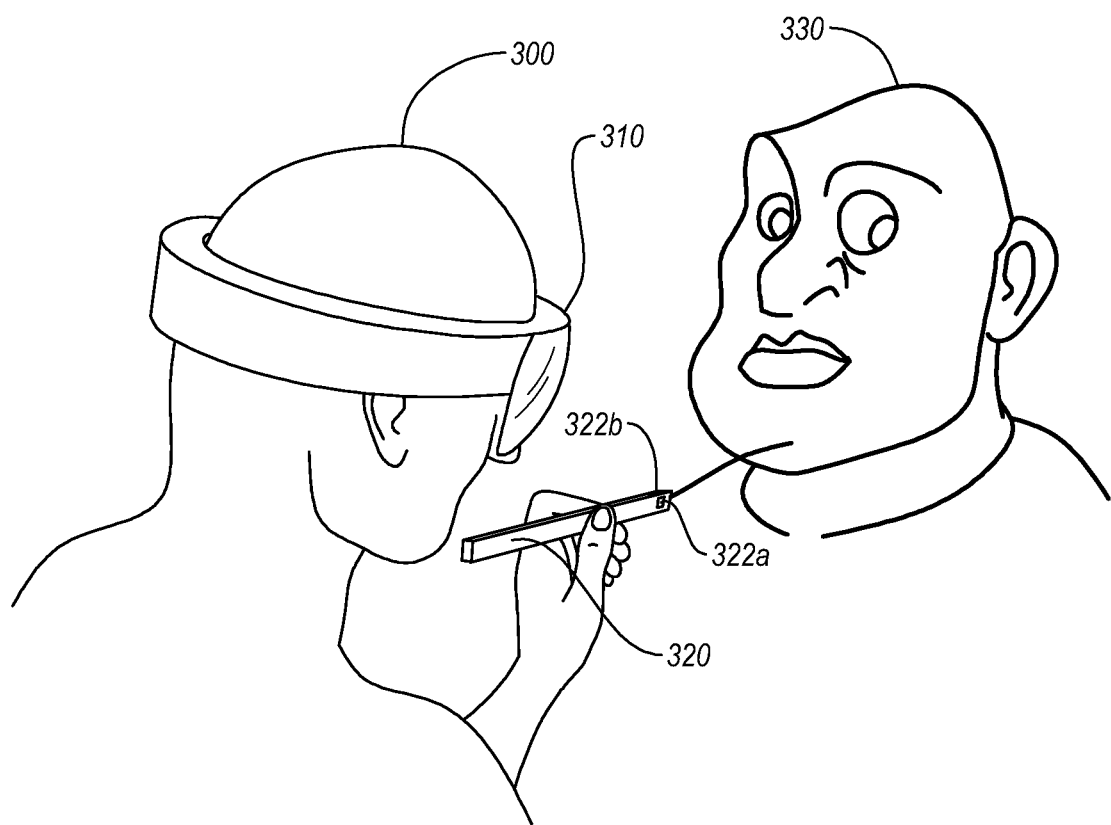
FIG. 3 illustrates a perspective view of a user utilizing an embodiment of a system with multiple devices and multiple sensors associated with the devices.

As an example of a system comprising two different devices, FIG. 3 illustrates a perspective view of a user utilizing an embodiment of a system with multiple devices and multiple sensors associated with the devices. In the depicted embodiment, the first device comprises a wearable device 310, and the second device comprises a wearable device controller 320. The depicted wearable device 310 comprises a head-mounted display, but in alternative embodiments could comprise any number of different wearable devices. The wearable device controller 320 comprises a computerized stylus. In at least one embodiment, the head-mounted display and stylus are components within a virtual-reality or mixed-reality system. For example, the user 300 is using the stylus to draw a virtual target 330 within space.

In order for the user's drawing actions to be properly rendered to the user 300 through the head-mounted display, it is important for the location of the stylus to be known to the computer system. In various embodiments, the computer system can use a variety of different methods to track the location of the stylus. For example, the stylus may be associated with an accelerometer sensor and a gyroscope sensor that are able to provide the computer system with information regarding the positioning and movements of the stylus. Additionally, in at least one embodiment, the stylus is tracked by a depth camera that is integrated within the head-mounted display. For example, two targets, in the form of reflectors 322a, 322b, are integrated into a surface of the stylus. The depth camera tracks the location and position of the stylus visually by tracking the reflectors 322a, 322b.

Accordingly, in at least one embodiment, the stylus comprises a second subset of sensors that includes a gyroscope and an accelerometer. Additionally, the head-mounted display comprises a first subset of sensors that includes a depth camera that is capable of tracking the location and motion of the stylus by visually tracking the reflectors 322a, 322b.

In various situations, the computer system is capable of optimizing the overhead related to the various sensors by decreasing or increasing, as needed, the resources consumed by the receptive sensors. For example, as described above, the computer system is capable of identifying that sensor data from a sensor (e.g., the depth camera) relates to sensor data from one or more other sensors (e.g., the gyroscope and accelerometer). Based upon the identified relationship between the sensor data received from the respective sensors, the computer system is capable of adjusting the state of the depth camera based upon a comparison of the categories and the overhead attributes associated with the depth camera to categories and overhead attributes associated with gyroscope and accelerometer.

Figure 4:
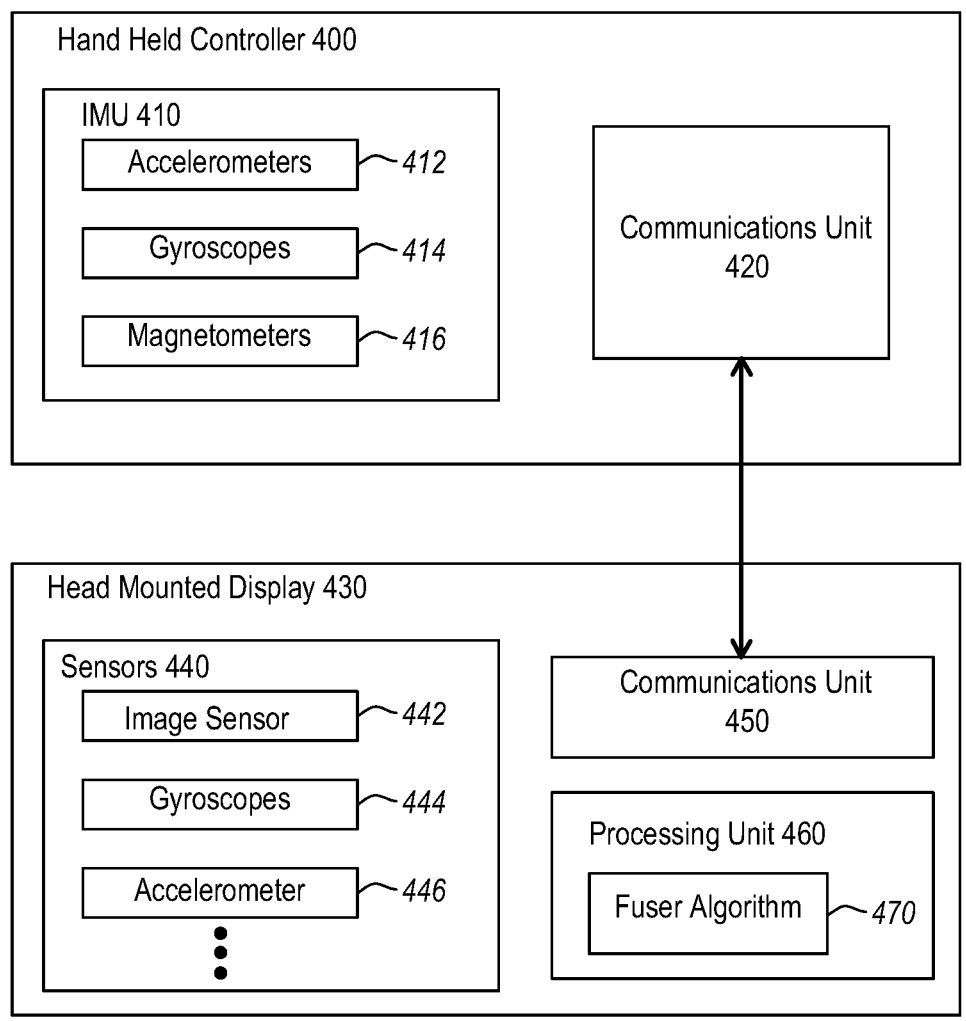
FIG. 4 illustrates a schematic view of an embodiment of two different computer systems that are associated with multiple respective sensors.

For example, FIG. 4 illustrates a schematic view of an embodiment of two different computer systems that are associated with multiple respective sensors. In particular, the depicted schematics include a schematic for a hand-held controller 400 (e.g., a stylus) and a head-mounted display 430. The second device (i.e., hand-held controller 400) comprises a second set of one or more sensors configured to communicate second sensor data to a processing unit 460 that is disposed within the first device (i.e., the head-mounted display 430). The second set of one or more sensors comprise an inertial measurement unit (IMU) that includes accelerometers 412, gyroscopes 414, and magnetometers 416. The IMU communicates the sensor data from the sensors to a communications unit 420. The communications unit 420 comprises a wireless and/or wired network interface that is in communication with a communications unit 450 within the head-mounted display 430.

The first device (i.e., the head-mounted display 430) comprises a first set of one or more sensors 440 configured to communicate first sensor data to the processing unit 460. The sensors 440 comprise an image sensor 442 such as, but not limited to, an IR camera, a depth camera, or a retroreflector detector, gyroscopes 444, accelerometers 446, and other sensors. The processing unit 460 is in communication with both the first device and the second device through the communication units 450, 420. In at least one embodiment, the processing unit 460 executes a fuser algorithm 470 that fuses, or combines, the various sensor data into data streams that are useable by the processing unit 460 to perform desired functions. For example, the fuser algorithm 470 may combine sensor data from the IMU 410 and the image sensor 442 in order to track the hand-held controller 400.

As explained above, in at least one embodiment, the processing unit 460 identifies related information within both the second sensor data received from the hand-held controller 400 and the second sensor data received from the sensors 440. The processing unit 460 identifies an overhead attribute associated with at least one sensor 412, 414, 416 within the second set of one or more sensors (i.e., the IMU 410). The processing unit 460 then adjusts a sampling rate of the at least one sensor based upon the overhead attribute and the related information. For example, the processing unit 460 may decrease the sampling rate of the IMU 410 based upon the ability of the image sensor 442 to track the hand-held controller 400.

In at least one embodiment, when the processing unit 460 is determining which sensors to adjust and how to adjust them, the hand-held controller 400 and the head-mounted display 430 collaborate on information. For example, it may be desirable to maximize the battery life of the entire system. As such, in at least one embodiment, the processing unit 460 may determine that the IMU uses significantly more power than related sensors within the head-mounted display 430. Typically, in response to this determination, the processing unit 460 would deactivate or otherwise decrease the usage of the IMU 410. However, the hand-held controller 400 and the head-mounted display 430 may collaborate by sharing information about their respective battery levels. In particular, the hand-held controller 400 may have significantly more battery life remaining than the head-mounted display 430. In such a case, even though the IMU 410 uses significantly more power, the processing unit 460 deactivates or otherwise decreases the usage of the sensors 440 within the head-mounted display 430 and relies more upon the IMU 410. By utilizing the IMU 410 instead of the sensors 440 within the head-mounted display, the system is able to function longer because the IMU 410 has more battery power available. As such, in various embodiments, the computer system adjusts the state of one or more sensors within a second device based upon current operating characteristics of both the first device and a second device.

Figure 5:
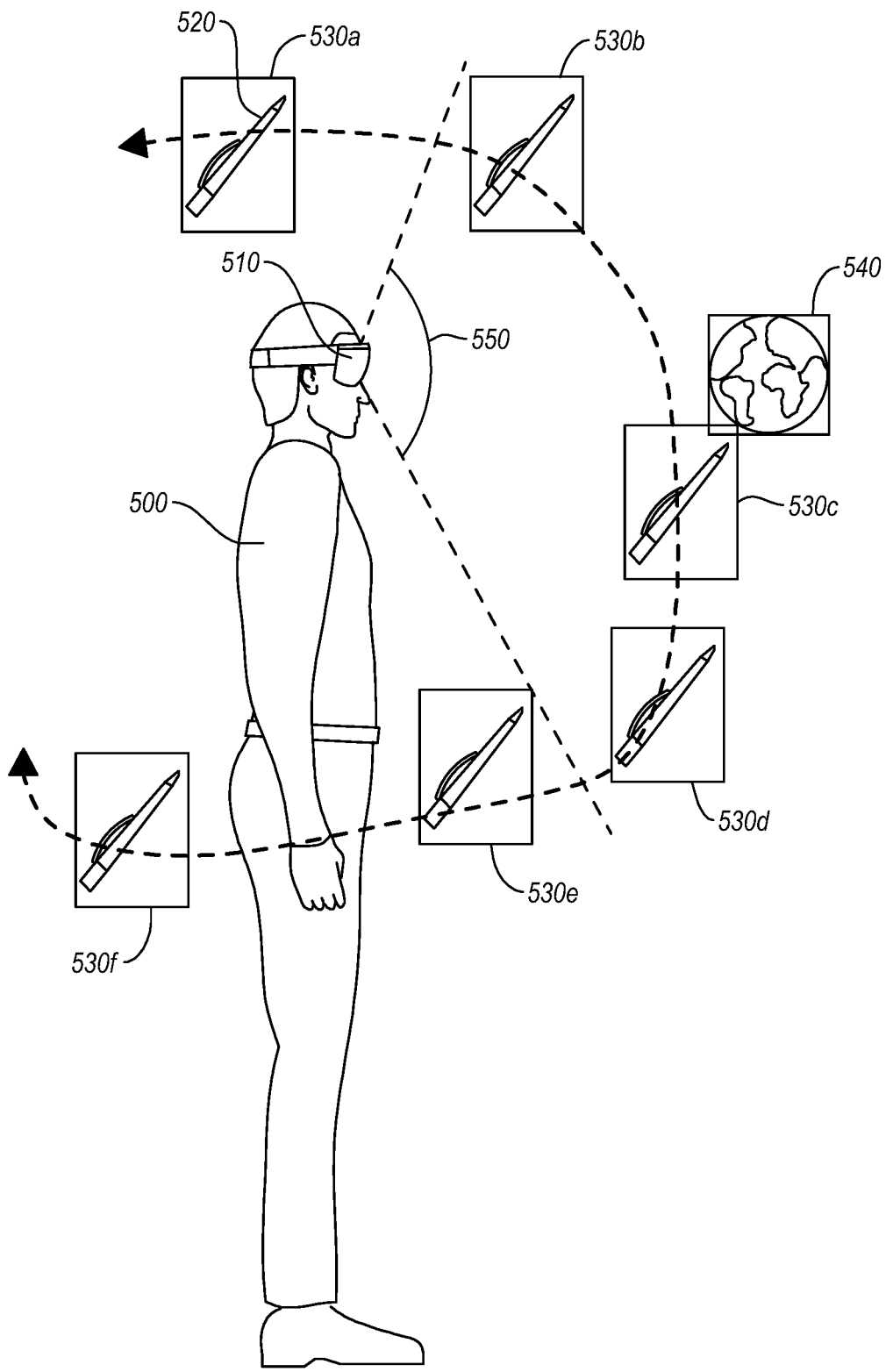
FIG. 5 illustrates a perspective view of a user utilizing another embodiment of a system with multiple devices and multiple sensors associated with the devices.

FIG. 5 illustrates a perspective view of a user 500 utilizing another embodiment of a system with multiple devices and multiple sensors associated with the devices. In particular, FIG. 5 depicts a user 500 interacting with a virtual-reality or mixed-reality headset 510 and a stylus 520. The stylus 520 is depicted as being at several different discrete locations 530a-530f around the user. FIG. 5 also depicts a field-of-view 550 of a camera integrated within the headset 510.

In at least one embodiment, the stylus 520 comprises a movement detection sensor, such as an accelerometer, that can be used to detect a relative position of the stylus 520. Additionally, the headset 510 comprises an image capture sensor, such as a camera, that is configured to track, among other things, the position of the stylus 520. In the depicted embodiment, the camera is only capable of tracking the stylus when a trackable portion (e.g., reflectors 322a, 322b) of the stylus is within the field-of-view 550 of the camera.

The depicted system is capable of optimizing system performance by adjusting the state of the image capture sensor and the position detection sensor. For example, the processing unit (shown in FIG. 4 as 460) is configured to lower the sampling rate of the position detection sensor when a trackable portion of the stylus is within the field-of-view 550 of the image capture sensor. For example, within positions 530b, 530c, and 530d, the camera is capable of detecting trackable portions of the stylus. One will understand that when the image capture sensor is able to track the location of the stylus, the position detection sensor within the stylus is less necessary, as such, it can be placed in a lower power state.

Similarly, the processing unit 460 is configured to increase the sampling rate of the position detection sensor when a trackable portion of the stylus 520 is outside a field-of-view 550 of the image capture sensor. For example, when the stylus is at location 530a, 530e, or 530f, the camera is no longer able to detect a trackable portion of the stylus. In such a case, the system is only able to track the relative location of the stylus 520 through the position detection sensor. As such, the processing unit 460 changes the state of the position detection sensor by increasing the sampling rate and/or changing the state of the image capture sensor by decreasing the sampling rate or deactivating the sensor.

In contrast, the processing unit 460 is configured to increase the sampling rate of the position detection sensor when a trackable portion of the stylus 520 is within a field-of-view 550 of the image capture sensor and the stylus is within a threshold distance from a target object 540. For example, FIG. 5 depicts position 530c as being adjacent to the target object 540, in this case a hologram. When the user 500 is directly interacting with a target object using the stylus 520 it is desirable to closely track the position and minute movements of the stylus. As such, the processing unit 460 changes the states of the image capture sensor and the position detection sensor by increasing the sampling rate and/or power being provided to the respective sensors. Combining the data streams from the two sensors may increase the resolution of sensor data related to the stylus, and increase the responsiveness of commands from the stylus.

Accordingly, disclosed embodiments are configured to dynamically adjust the state of various sensors based upon system overhead and/or categories of sensor data currently being received. Further, in at least one embodiment, adjusting a sensor state comprises adjusting the sampling rate of the sensor and/or adjusting the sampling rate of the transmitted sensor data. As such, a sensor may be sampled at a relatively high rate, but the transmitted data may be sampled at a rate that is lower than the sampling rate of the sensor itself. As such, the sensor state is adjustable both at the sensor and downstream from the sensor in order to optimize the system.

One will appreciate that embodiments disclosed herein can also be described in terms of flowcharts comprising one or more acts for accomplishing a particular result. For example, FIG. 6 and the corresponding text describe acts in various systems for performing methods and/or stand-alone methods for rendering an image within a computer system. The acts of FIG. 6 are described below.

Figure 6:
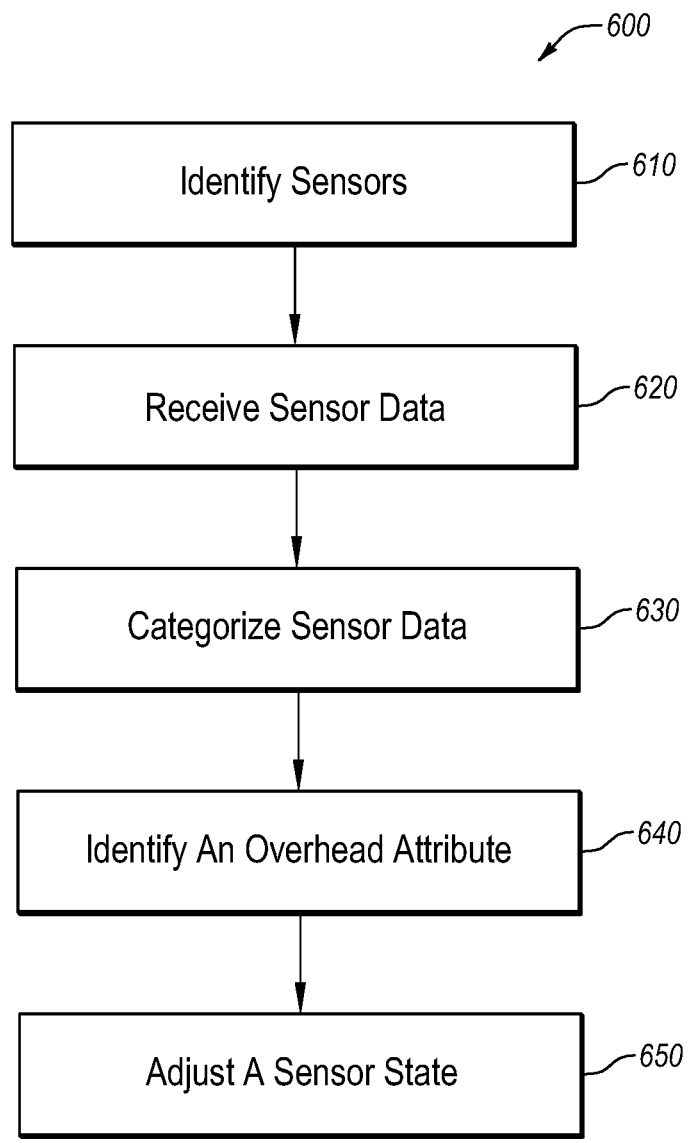
FIG. 6 illustrates a flowchart for an embodiment of a method for optimizing sensor performance.

For example, FIG. 6 illustrates a flowchart 600 for an embodiment of a method for optimizing sensor performance. The illustrated acts comprise an act 610 of identifying sensors. Act 610 includes identifying a set of sensors that are configured to communicate sensor data to a computer system. For example, as depicted and described with respect to FIG. 4, a computing unit 460 identifies sensors 412, 414, 416 within a hand-held controller 400 and sensors within the head-mounted display 442, 444, 446.

FIG. 6 also illustrates an act 620 of receiving sensor data. Act 620 includes receiving the sensor data from each sensor within the set of sensors. For example, as depicted and described with respect to FIG. 2, the computer system receives sensor data 212, 222, 232, 242, 252, 262 from sensors 210, 220, 230, 240, 250, 260 within a set of sensors 200. The sensor data can be received directly (through a wired or wireless connection) or indirectly through one or intermediary computing devices.

Additionally, FIG. 6 illustrates an act 630 of categorizing sensor data. Act 630 includes categorizing the sensor data received from each sensor within the set of sensors. For example, as depicted and described with respect to FIG. 1, a sensor data API 150 within the computer system 100 categorizes the received sensor data into categories such as uniqueness and/or confidence. Particular sensor data may be associated with multiple different categories based upon the information within the sensor data.

FIG. 6 further illustrates an act 640 of identifying an overhead attribute. Act 640 includes identifying an overhead attribute associated with each sensor within the set of sensors. For example, as depicted and described with respect to FIG. 1, a system status API 140 identifies overhead attributes associated with each sensor within a set of sensors 160. The overhead attributes may comprise power usage, bandwidth usage, thermal outputs, and other similar overhead attributes that a sensor leverages on a system.

Further still, FIG. 6 illustrates an act 650 of adjusting a sensor state. Act 650 includes adjusting a state of at least one sensor within the set of sensors based upon both a category and an overhead attribute associated with the at least one sensor. For example, as depicted and described with respect to FIG. 5, the processing unit 460 adjusts the sample rate of the position detection sensor within the stylus 520 and the image capture sensor within the headset 510 based upon the location of the stylus 520 with respect to the target object 540 and the field-of-view 550 of the image capture sensor.

One will understand that computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems. Accordingly, embodiments of this disclosure and any combination of the foregoing acts may be implemented by a single computing device or by several computing devices in a distributed computing environment.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry computer code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for optimizing system overhead when handling multiple input streams of sensor data, comprising:
   one or more processors; and
   one or more computer-readable media having stored thereon executable instructions that are operable when executed by the one or more processors to configure the computer system to perform at least the following:
   identify a set of sensors that are configured to communicate sensor data to the computer system;
   receive the sensor data from the set of sensors;
   categorize the sensor data received from the set of sensors, wherein the sensor data is categorized based on one or more characteristics of the sensor data or the sensors within the set of sensors;
   identify an overhead attribute associated with one or more sensor within the set of sensors; and
   adjust a state of at least one sensor within the set of sensors based upon both the categorization of the sensor data and the overhead attribute associated with the at least one sensor.

2. The computer system as recited in claim 1, wherein:
   the set of sensors comprises a first subset of sensors disposed within a first device and a second subset of sensors disposed within a second device; and
   the first device and the second device are physically separate devices.

3. The computer system as recited in claim 2, wherein:
   the first device comprises a wearable device; and
   the second device comprises a wearable device controller.

4. The computer system as recited in claim 1, wherein categorizing the sensor data comprises identifying a uniqueness of the sensor data from a particular sensor with respect to other sensors within the set of sensors.

5. The computer system as recited in claim 1, wherein categorizing the sensor data comprises identifying a confidence associated with the sensor data from a particular sensor with respect to other sensors within the set of sensors.

6. The computer system as recited in claim 1, wherein a particular overhead attribute associated with a particular sensor comprises a power consumption associated with the particular sensor.

7. The computer system as recited in claim 1, wherein a particular overhead attribute associated with a particular sensor comprises a bandwidth associated with the particular sensor.

8. The computer system as recited in claim 1, wherein adjusting the state of the at least one sensor comprises deactivating the at least one sensor.

9. The computer system as recited in claim 1, wherein the executable instructions include instructions that are executable to cause the computer system to:
    identify that sensor data received from the at least one sensor relates to sensor data that is received from one or more other sensors from the set of sensors; and
    adjust the state of the at least one sensor based upon a comparison of the category and the overhead attribute associated with the at least one sensor to categories and overhead attributes associated with each of the one or more other sensors from the set of sensors.

10. A method for optimizing sensor performance, the method comprising:
    identifying a set of sensors that are configured to communicate sensor data to a computer system;
    receiving the sensor data from the set of sensors;
    categorizing the sensor data received from the set of sensors, wherein the sensor data is categorized based on one or more characteristics of the sensor data or the sensors within the set of sensors;
    identifying an overhead attribute associated with each sensor within the set of sensors; and
    adjusting a state of at least one sensor within the set of sensors based upon both the categorization of the sensor data and the overhead attribute associated with the at least one sensor.

11. The method as recited in claim 10, wherein:
    the set of sensors comprises a first subset of sensors disposed within a first device and a second subset of sensors disposed within a second device; and
    the first device and the second device are physically separate devices.

12. The method as recited in claim 10, wherein a particular overhead attribute associated with a particular sensor comprises a processing workload associated with the particular sensor.

13. The method as recited in claim 10, wherein a particular overhead attribute associated with a particular sensor comprises a power consumption associated with the particular sensor.

14. The method as recited in claim 10, wherein a particular overhead attribute associated with a particular sensor comprises a bandwidth associated with the particular sensor.

15. The method as recited in claim 10, further comprising:
    identifying a priority of the sensor data from the at least one sensor based upon a relationship between a uniqueness of the sensor data from the at least one sensor and an overhead attribute associated with the at least one sensor.

16. One or more computer-readable hardware storage devices having stored computer-executable instructions that are operable, when executed by one or more processors of a computer system, to configure the computer system to perform at least the following:
    identify a set of sensors that are configured to communicate sensor data to the computer system;
    receive the sensor data from the set of sensors;
    categorize the sensor data received from the set of sensors, wherein the sensor data is categorized based on one or more characteristics of the sensor data or the sensors within the set of sensors;
    identify an overhead attribute associated with one or more sensor within the set of sensors; and
    adjust a state of at least one sensor within the set of sensors based upon both the categorization of the sensor data and the overhead attribute associated with the at least one sensor.

17. The one or more computer-readable hardware storage devices as recited in claim 16, wherein:
    the set of sensors comprises a first subset of sensors disposed within a first device and a second subset of sensors disposed within a second device; and
    the first device and the second device are physically separate devices.

18. The one or more computer-readable hardware storage devices as recited in claim 17, wherein:
    the first device comprises a wearable device; and
    the second device comprises a wearable device controller.

19. The one or more computer-readable hardware storage devices as recited in claim 16, wherein:
    categorizing the sensor data comprises identifying a uniqueness of the sensor data from a particular sensor with respect to other sensors within the set of sensors.

* * * * *